June 26, 1956 LE GRAND H. LULL 2,752,056
LOAD HANDLING, TRANSPORTING AND
POSITIONING VEHICULAR MACHINE
Filed Dec. 12, 1951 9 Sheets-Sheet 9

INVENTOR.
LE GRAND H. LULL
BY
Carlsen & Hagle
ATTORNEYS

United States Patent Office 2,752,056
Patented June 26, 1956

2,752,056

LOAD HANDLING, TRANSPORTING AND POSITIONING VEHICULAR MACHINE

Le Grand H. Lull, Minneapolis, Minn., assignor, by mesne assignments, to The Baker-Raulang Company, a corporation of Delaware Application December 12, 1951, Serial No. 261,229

15 Claims. (Cl. 214—660)

This invention relates to improvements in vehicular loaders for handling, transporting and positioning heavy and lengthy loads, such as lumber, concrete pipe, structural steel and the like.

In many respects the present invention is similar to that disclosed in my prior application Serial No. 56,071 for Load Handling and Transporting Machine, filed October 23, 1948, now Patent No. 2,621,811, issued December 12, 1952. Thus as in the earlier invention I here provide a vehicular frame, having front and rear spaced and transversely positioned supports, connected at one side of the machine by a heavy longitudinal backbone structure, but open at the opposite side of the frame. Located in this opening is a load holder carried by a vertically movable load carrier, hydraulically actuated, and movable along and/or with a collapsible tower similar to that disclosed in my prior Patent No. 2,394,458, issued February 6, 1946, for Load Handling Mechanism. This mechanism, which will be hereinafter referred to for convenience simply as a loader, is mounted upon a carriage assembly, by which the loader may be moved transversely with respect to the normal forward or rearward direction of travel of the vehicular frame, to thrust the load holder out through the open side of the frame to pick up or deposit a load alongside the path of the machine. The load holder may be raised or lowered and moved transversely of the vehicle to lift the load from the ground and bring it back over the spaced supports and deposit it thereon for transport, or vice versa or the load holder may be elevated to a considerable height for stacking materials, such as lumber or pipe, or for positioning a structural member while it is secured in a building framework, etc. It will be readily appreciated without further discussion that a machine of this type will have many uses, and is particularly adaptable to handling very lengthy materials or loads, inasmuch as such materials are transported endwise and they thus may be maneuvered through relatively constricted spaces or arisles.

When the load holder is thrust out of the side of the vehicle the load forces are particularly heavy upon that side of the machine, and to prevent tipping of the machine as a whole, I have provided the vehicle with jacks which may be thrust outward and downward from this side of the machine into supporting engagement with the ground. The machine is, of course, stationary while this operation takes place and I have found that it is all too frequently necessary to retract these jacks so that the machine as a whole may be maneuvered forward or backward to line up the load for proper stacking and related purposes, all of which consumes considerable time. It is accordingly a primary object of my present invention to provide means associated with the loader, per se, by means of which the load holder may be given what I prefer to term a translate motion, or a movement parallel with the direction of travel of the machine, but independent of the machine itself. It will be seen that the machine when so constructed may be moved up to the proper position, as nearly as possible, and then, even with the jacks in supporting engagement with the ground and the machine itself stationary, the load may be moved in either forward or rearward directions in order to bring it into proper position. As a further important object of this invention I provide still two other movements for the load holder which movements form part of the loader mechanism and by which the load may be pitched or tilted in a longitudinal, vertical plane, substantially parallel with the direction of travel of the vehicle, and given a yaw movement, or swung in a substantially horizontal transverse plane with respect to the machine. These five adjustments or positioning movements of the load holder and load, when used singly or in any desired combination, will obviously permit the load to be adjusted very precisely and in any reasonably desirable direction.

A further object of my invention is to provide a loader mechanism in which all of the foregoing five adjustments or movements form a part of the loader, per se. as distinguished from the vehicle or the grab thus making it possible to use any particular or desired type of load holder, such as forks, skids, slings and the like, without interfering with such adjustments of the load, be it of any nature whatever.

Another object of my present invention is to provide an improved vehicular frame for a load handling, transporting and positioning machine of the nature referred to, which frame is made up essentially of tubular parts for maximum strength and lightness and which furthermore is of a low-slung construction, making it possible to transport a load with the center of gravity very close to the ground surface and to operate the machine under low headroom conditions.

Still a further object of this invention is to provide a completely hydraulic or fluid actuated loader with all of the adjustments or movements thereof carried out by fluid motors, with an improved arrangement of the control valves so that the actuating handles or levers thereof are moved in exactly the same planes as is the load, as a result of operation of these valves.

These and other more detailed and specific objects will be disclosed in the course of the following specification, reference being had to the accompanying drawings, in which—

Fig. 5 is an enlarged fragmentary side view and vertical section taken substantially along the line 5—5 in Fig. 2 and viewing the loader itself from what may be termed its back or rear side.

Referring now more particularly and by reference characters to the drawing, the material or load handling, transporting and positioning machine according to my present invention comprises a vehicular frame, which is designated generally at A, and associated with which is a loader mechanism, designated generally at B, by means of which the load or material is actually lifted and maneuvered about as will be described. Forming part of the loader B is a vertically movable, collapsible tower assembly C similar in construction and operation to that shown in my prior Patent No. 2,394,458. Only such parts of the mechanism C as necessary to an understanding of the over-all operation of my present invention will be described herein, and attention is invited to my Patent No. 2,394,458 for a more detailed disclosure.

Figure 4:
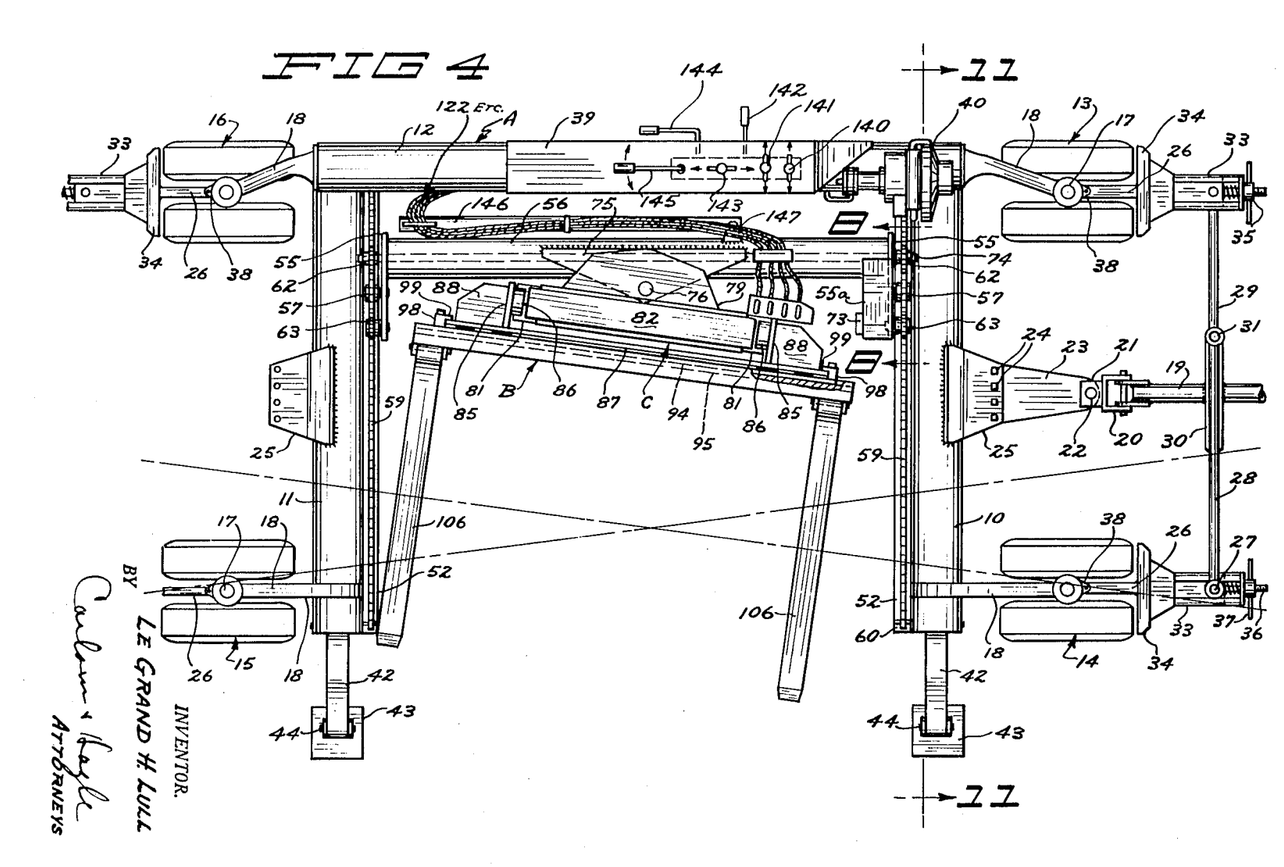
Fig. 4 is a top plan view of the machine, as in Fig. 3, but illustrating the load holder as swung in one direction to yaw the load and with dotted center lines indicating the manner in which this yaw motion may be made in opposite directions.

The frame A shown comprises forwardly and rearwardly spaced, transversely extending support or cross members 10 and 11, which are made of heavy metal tubing as clearly seen in the drawing. At one side of the frame these members 10 and 11 are welded to short tubular risers 10ª and 11ª, and these in turn are welded at their upper ends to the longitudinally extending tubular side member 12. This assembly forms a U-shaped frame structure which is closed at one side of the frame by the member 12 and open at the opposite side, as best seen in Fig. 4, with the risers 10ª—11ª locating the cross tubes 10—11 considerably below the side member 12. When the load is being transported by the machine the load may be rested upon these cross tubes 10 and 11, as will presently appear, and it will be noted that these tubes are located very close to the ground surface so that the center of gravity will be kept very low, in addition to which the over-all height of the machine is materially reduced for operation where headroom is at a premium. The frame is supported by four sets of dirigibly mounted dual wheels, designated at 13, 14, 15 and 16, and each set of wheels is mounted by means of a vertical spindle, indicated throughout at 17, in bearings provided for their reception in the extremities of arched brackets, designated throughout at 18, so as to position the wheel sets in spaced relation and adjacent the cross tubes 10 and 11. The brackets 18 at the open side of the frame are welded to the cross tubes 10—11, near their extremities, while at the opposite side the brackets 18 are differently shaped and are welded to the adjacent ends of the side member 12. This arrangement spaces the wheel sets at the opposite ends of the machine widely apart so that the load may be rested upon the cross tubes 10—11 between the wheels, this being necessary for the reason that these cross tubes are located in about the same horizontal plane as the centers of the wheels themselves.

Figure 1:
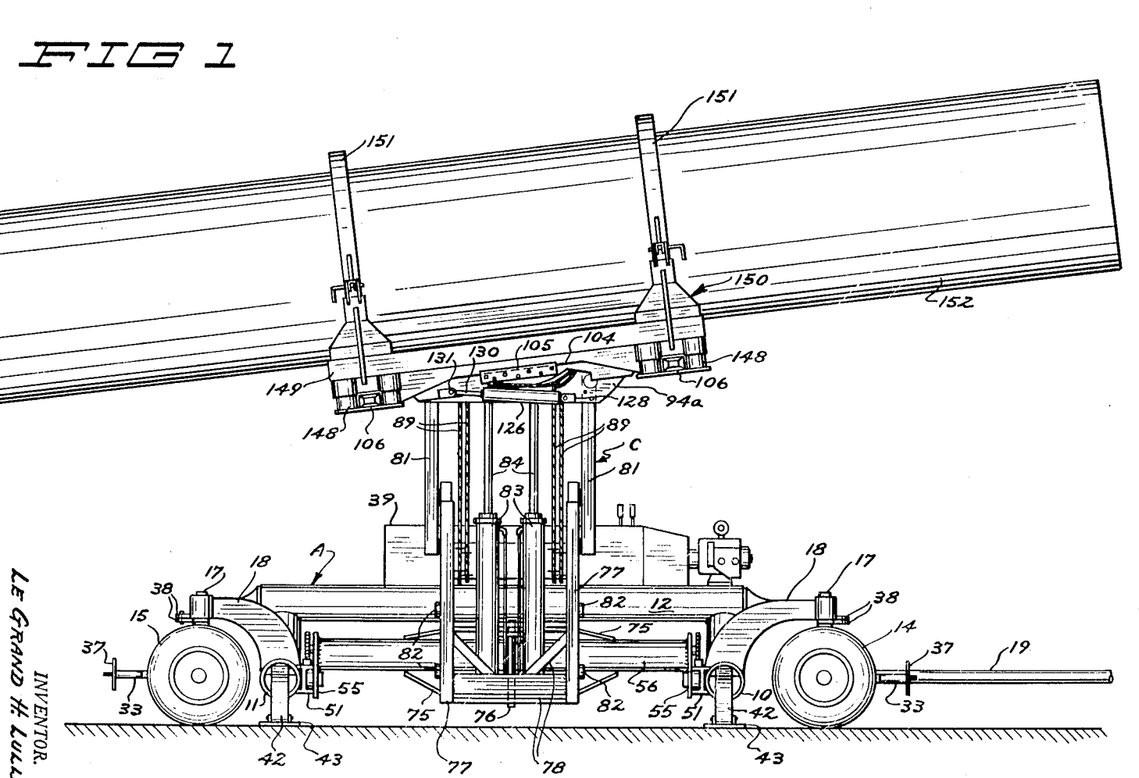
Fig. 1 is a side elevation of a machine according to my present invention, illustrating the load as carried or clamped in a skid, with the load holder and the load partially elevated and tilted to indicate the pitch adjustment. In this view also the support jacks at the open side of the frame are shown as lowered to the ground.
Figure 2:
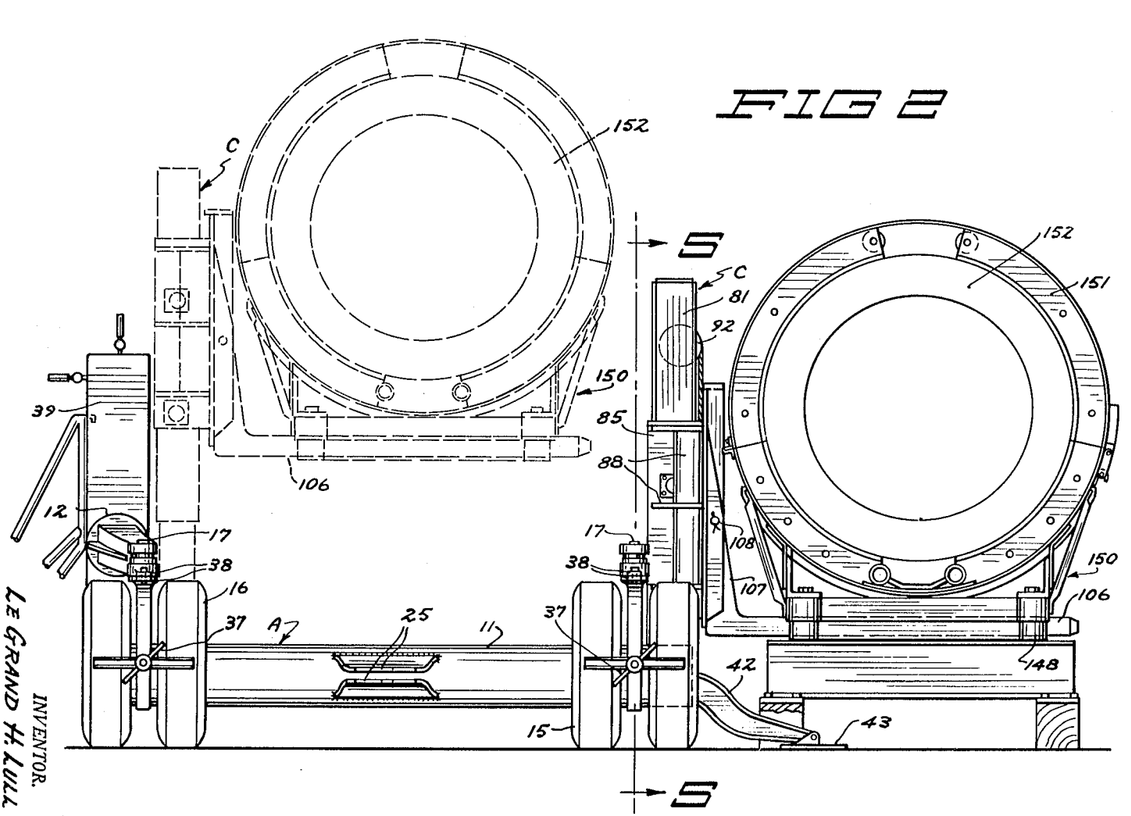
Fig. 2 is an end view of the machine taken from the left as viewed in Fig. 1, but on an enlarged scale, and showing the load holder as thrust out to the side and the load resting upon the ground. The loader and load are also shown in dotted lines in this view as they appear when the load holder and load is pulled back in over the machine and partially elevated.
Figure 3:
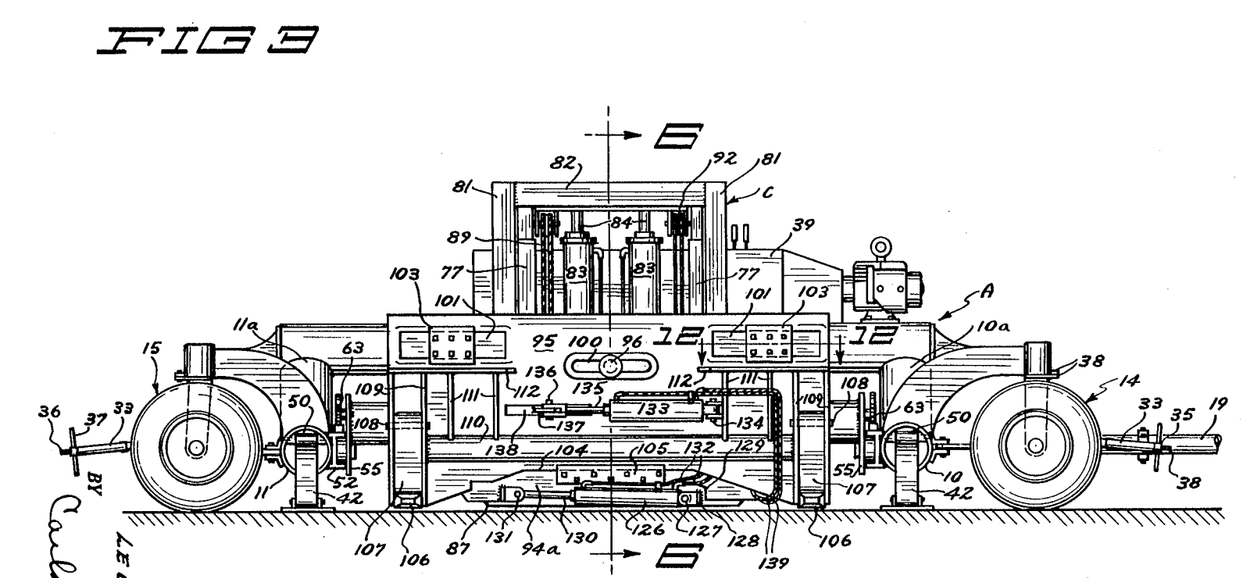
Fig. 3 is a view similar to Fig. 1 but on an enlarged scale and with the load and skid omitted to better disclose the construction of the loader itself. In this view also the load carrier is shown in a lowered position.
Figure 10:
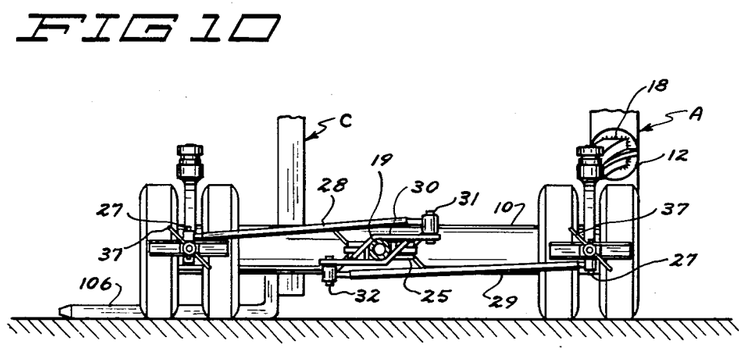
Fig. 10 is an end view of the lower part of the machine with the draft and steering tongue shown in cross section and particularly illustrating the overlapping connections of the steering rods.

In the present instance the machine is shown as being of the trailer type, adapted to be pulled behind a towing tractor, and the machine is further shown as reversible so that it may be towed from either end or a plurality of the machines may be arranged in train. A draft tongue 19 is accordingly provided and at one end is provided with a transverse pivot connection 20 to a clevis 21, which is attached by vertical pivot pins 22 to a clevis plate 23 which may be bolted, as designated at 24, between brackets 25 which are welded in pairs at the centers of each cross tube 10—11. Thus this draft assembly may be attached to either end of the frame, and in order to properly steer the wheels at the towing end a connection is made from the tongue 19 to the wheels at opposite sides thereof. Each of the four wheel sets is provided with longitudinally extending steering arms 26 and detachable pivot connections 27 are made to these arms from the opposite ends of steering or radius rods 28—29. The steering rods 28—29 extend inwardly, respectively above and below the tongue 19, in overlapping relation, as viewed from the top, and secured to the tongue is a bracket structure 30 having pivot connections 31 and 32 to these rods. Lateral swinging motions of the tongue, as the towing vehicle is steered to either side, will thus be transmitted to the wheel sets through the rods 28—29 in order to properly angle these wheels to follow the path of the towing vehicle. The overlapping inner pivot connections of the steering rods 28—29 are necessary in order to swing the connected wheel sets sharply enough and to the proper angles to cause these wheels to track as the turn is made and overcome any tendency of the wheels to be skidded while the machine is traveling a curved path. Slidably mounted upon each of the arms 26 is a brake yoke 33 which, adjacent the wheels, carries a transversely extending brake shoe 34, which may be thrust against the peripheries of the tires on the wheels to lock them against rotation and brake the machine. For this purpose nuts 35 are threaded upon studs 36 and provided with handles 37 so that they may be turned in order to forcefully engage the brake shoes with the tires. In addition, as a part of this mechanism, and as shown in Figs. 1, 3 and 10, the bearings for the spindles 17 of the wheel sets, and these spindles themselves, are both provided with apertured lugs 38 which will register when the wheel sets are in position for straightahead travel, so that the operator may, by thrusting suitable pins through these lugs, lock the wheels in such positions when required.

Figure 6:
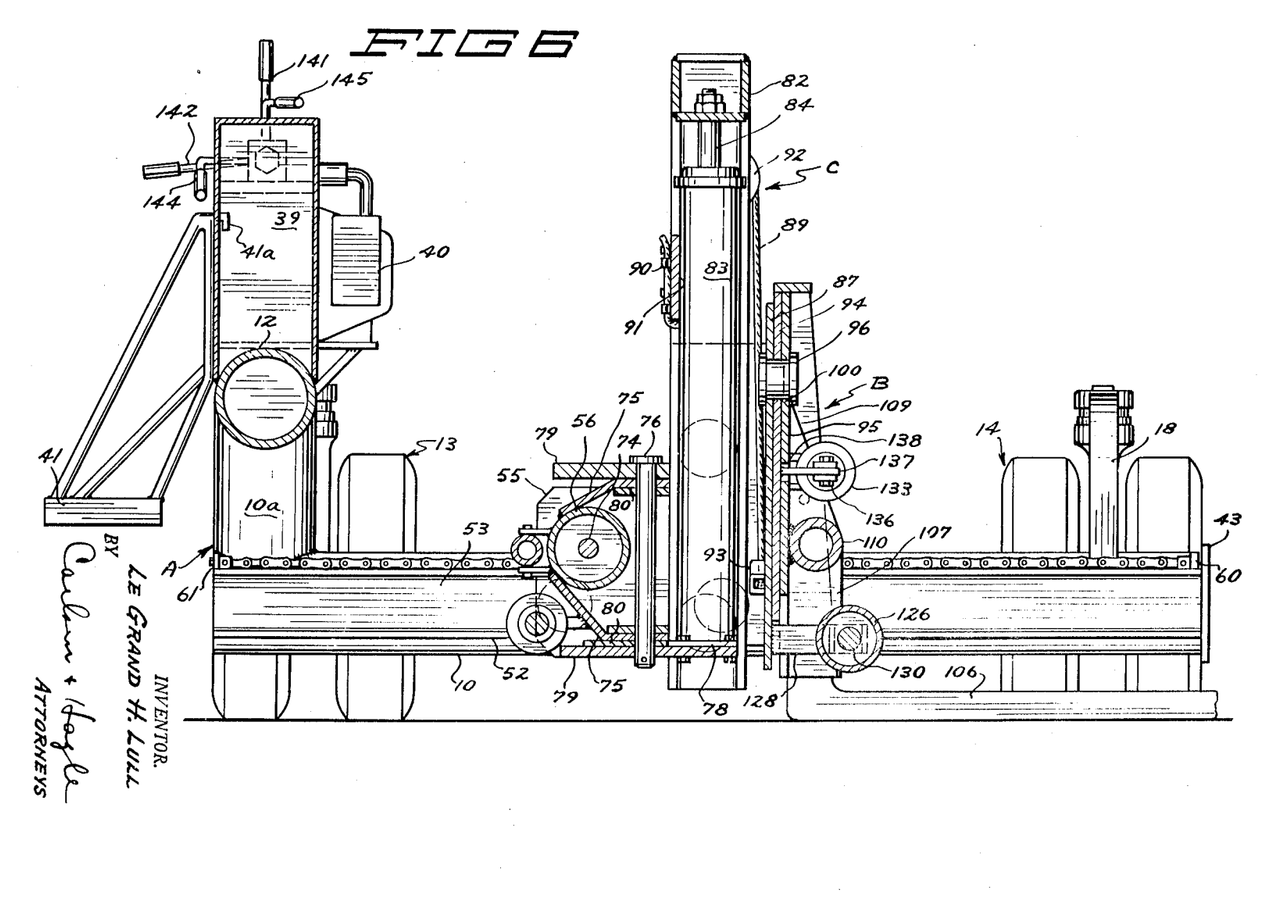
Fig. 6 is an enlarged vertical cross section taken substantially along the line 6—6 in Fig. 3.

The frame structure further includes a housing assembly, extending along and supported by the side member 12, and here designated at 39. Contained within this housing assembly are a suitable source of fluid and associated pumps and valves (not shown) by which fluid under pressure is supplied for operation of the loader B and certain parts of which will be later described. Power for operation of the pump is provided by a conventional power plant, such as a small internal combustion engine, a part of which appears at 40 in Fig. 4. All such actuating parts are thus placed along the closed side of the frame A leaving the opening in the frame unimpeded, and further placing the weight where it will act to best advantage to counterbalance the machine when loaded. Also at this closed side of the machine a platform 41 is provided on which the machine operator may stand, safely out of the way of the loader and in position for the convenient actuation of the valves, the handles of which project from the housing 39, as will also later appear. This platform is removable, having hooks 41ª for this purpose (Fig. 6).

Figure 11:
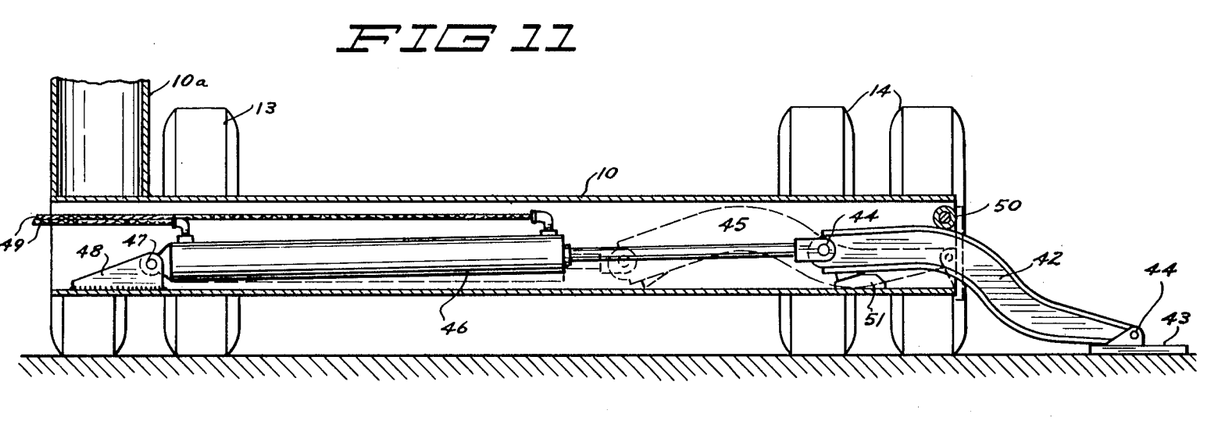
Fig. 11 is an enlarged, longitudinal, cross sectional view along the line 11—11 in Fig. 4 and showing the construction and operating mechanism for one of the support jacks.

The vehicular frame assembly also includes retractible jacks at the open side of the frame. The jacks are designated at 42 and their arrangement is best shown in Fig. 11. When in operative position the jacks 42 project from the open ends of the cross tubes 10—11, outward and downward, so that sole plates 43, pivoted at 44 to the outer extremities of the jacks, will be thrust firmly against the ground at a considerable lateral distance from the open side of the frame. The jacks comprise compound curved members, the inner ends of which are pivoted at 44 to the plungers 45 of jack cylinders 46, located lengthwise inside the cross tubes and pivoted at their ends at 47 to a bracket 48 welded in the tube. Fluid under pressure is supplied selectively to the opposite ends of the cylinders 46 by fluid lines 49, and when the plungers 45 are projected from the cylinders by the fluid they will thrust the connected jacks 42 outward from the open side of the frame. As the jacks move outward they are held downward by rollers 50 adjacent the open end of the cross tube, while the inner ends of the jacks ride up over cam lugs 51 in the tubes, so as to forcefully thrust the outer ends of the jacks and the sole plates 43 down against the ground. On the other hand, as the plungers 45 are retracted into the cylinders 46 the associated jacks 42 will be pulled into the cross tubes, until they reach the position shown in dotted lines in Fig. 11, at which point the sole plates 43 will fold flush against the ends of the cross tubes so that they will be out of the way.

Figure 8:
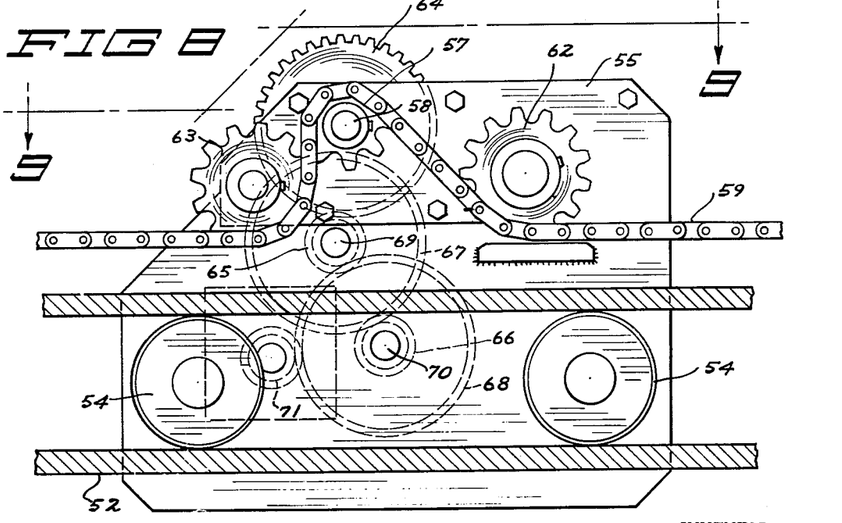
Fig. 8 is an enlarged sectional detail view along the line 8—8 in Fig. 4 and illustrating a mechanism by which the loader is moved transversely of the vehicular frame.
Figure 9:
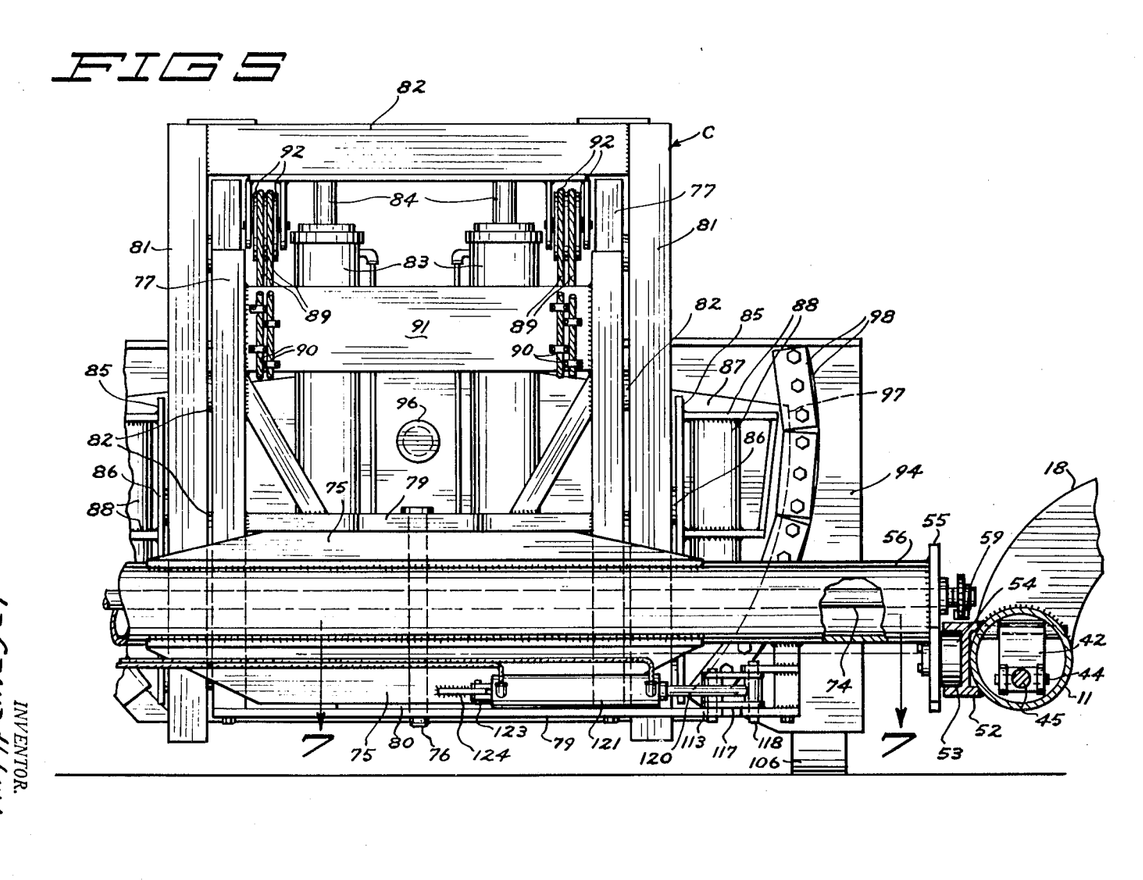
Fig. 9 is a plan view of the mechanism of Fig. 8 as viewed along the line 9—9 therein.

The loader B is supported for transverse motions with respect to the frame A by means of guides 52, which are welded along the facing sides of the cross tubes 10—11, and which have facing channels 53 in which rollers 54 operate. These rollers 54 are journaled upon end plates 55, which are in turn welded at the ends of a main support or torque tube 56 extending longitudinally with respect to the frame, and it will be obvious that this structure will thus roll inwardly and outwardly in the opening between the cross tubes 10—11. This movement of the assembly is carried out hydraulically, and as best shown in Figs. 8 and 9 the end plates 55 carry drive sprockets 57, journaled on stub shafts 58, over which run sprocket chains 59 extending along the length of the guides 52 and secured at opposite ends thereto, as designated at 60 and 61. These chains also run under idler sprockets 62 and 63, journaled on the end plates 55, and at one end the connections 61 appearing in Fig. 6 are adjustable in order to maintain the chains in taut condition. One of the shafts 58 carries a gear 64 which forms a part of a speed reducing gear train comprising pinions 65 and 66 and meshing gears 67 and 68, which are carried by journaled shafts 69 and 70 in the end plate 55, and the gear 68 meshes with a drive pinion 71 which is secured to the output shaft 72 of a rotary fluid motor 73. This gear train and drive assembly are best shown in Figs 8 and 9 and it will be understood that the fluid motor 73 is of the type to which fluid may be selectively admitted to rotate the shaft 72 in opposite directions, so as to move the carriage assembly inward and outward across the cross tubes 10—11. The gear train is positioned between the adjacent end plate 55 and a bracket plate 55a is supported parallel thereto and welded to the tube 56, as seen in Fig. 9. The fluid motor 73 is of the high speed type and the necessary reduction for moving the carriage assembly comparatively slower is accomplished through the gear system just described.

In order that the drive be transmitted equally to the opposite ends of the carriage assembly, the sprockets 62 are secured to the ends of a shaft 74, journaled entirely through the tube 56, so that these sprockets will necessarily operate in unison.

Diverging mounting brackets 75 are welded to the tube 56 and have vertically spaced extremities, which project horizontally toward the open side of the frame and which are apertured to receive a vertical yaw pivot pin 76, shown in Figs. 4 and 6. The vertically movable loader tower C comprises an inner, lower section having uprights 77, and these are rigidly cross connected and braced by a suitable lower frame structure designated at 78 in Fig. 1. Also secured to the uprights and frame structure are upper and lower bracket plates 79, overlapping the aforesaid brackets 75, and also apertured to pivot upon the yaw pivot pin 76, thus maintaining the loader tower for swinging motions about a vertical axis and in horizontal transverse planes. Suitable shim and wear plates, designated throughout at 80, are also provided to complete this pivot structure. Laterally overlapping the uprights 77 are the uprights 81 of an outer, upper and vertically movable tower section, and these uprights 81 are I-shaped in cross section to form inner and outer vertical channels. Rollers 82, journaled in vertically spaced relation upon the outer sides of the uprights 77, roll in the inner channels so that the uprights 81 will be held in vertical alignment, but so that this upper tower frame may move upwardly and downwardly with respect to the lower section. At the upper ends the uprights 81 are rigidly cross connected by a header 82, and extending vertically between this header and the lower frame structure 78 is a pair of lifting rams, each of which comprises a cylinder 83 firmly based on the frame structure 78, and an upwardly and downwardly moving, upwardly projecting plunger 84 secured to the header 82. This arrangement is thus obviously such that the admission of fluid to the lower ends of the cylinders 83 will upwardly project the plungers 84 to elevate the upper section of the tower, and vice-versa. As stated hereinbefore, this vertically telescoping and hydraulically actuated tower structure is disclosed in my Patent No. 2,394,458 and no further description should be necessary herein.

The loader, per se, further includes a vertically movable load carrier which comprises side plates 85, located at opposite sides of the uprights 81, and carrying rollers 86 to roll in the outer channels of said uprights. These plates 85 are rigidly tied together by means of a back plate 87 and heavy brackets and torque tubes 88 rigidly secure these plates together to resist the twisting stresses to which they are subjected as the load is lifted and moved about. This load carrier structure moves upwardly with the upper tower section and also moves upward independently thereof, as pointed out in my prior patent, and for this purpose cables 89, at the opposite sides of the structure, are rigidly secured at 90 to a bracket plate 91 welded to the stationary lower portion of the tower, from which point the cables extend upward and then down over pulleys 92, carried by the header 82, and best shown in Figs. 3 and 5. The opposite ends of the cables are then secured to the back plate 87, as designated at 93 in Fig. 6, and thus the upward movement of the header 82 by the hydraulically extensible plungers 84 will cause the pulleys 92 to pull on the cables 89 in such fashion as to cause the carrier structure, including the plates 85 and 87, to travel upward to the top of the extended tower.

Figure 12:
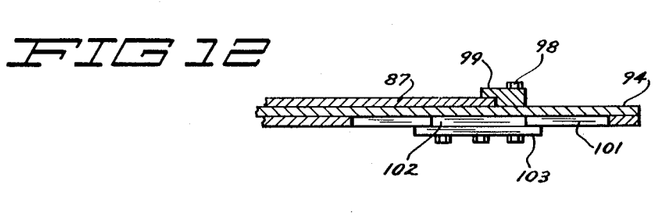
Fig. 12 is an enlarged detail sectional view on the line 12—12 in Fig. 3.

Mounted in face-to-face relation with the back plate 87 is a swingable pitch plate 94, extending at opposite ends beyond the extremities of plate 87 and being also vertically extended above the upper edge of this plate. Facing the pitch plate 94 is a translate plate 95, and these plates are all connected at the center of the assembly by a heavy pivot stud 96 which supports the pitch plate 94 for swinging movements in a vertical plane extending longitudinally with respect to the machine as a whole. The ends of the back plate 87 are curved on arcs centered at the pivot stud 96, and these edges are designated at 97. On the rear side of the pitch plate 94 I then mount a plurality of clips 98 rearwardly offset, as seen at 99 in Fig. 4, to slidably overlie the edges 97, so as to firmly hold these plates against separation but permit the just described pitching or tilting motions of the plate 94. The translate plate 95 faces the open side of the machine and this plate is arranged for sliding movements forwardly and rearwardly or longitudinally with respect to the other plates 87 and 94. For this purpose, in the first place, plate 95 has a horizontally elongated slot 100 where the stud 96 projects through, and in addition at its opposite upper corners, has elongated rectangular slots 101 through which project carrier blocks 102 slidable in said slots. Thus the translate plate 95 may slide as desired with respect to the plate 94 and the carrier blocks 102 are capped by retainer plates 103, bolted in place and overlying the margins of the slots 101 to hold the plates in assembly. This structure is best shown in Fig. 12. The lower edge of the translate plate 95 is upwardly offset at 104 to expose a lower portion of the pitch plate 94, as shown at 94ᵃ in Fig. 3, and this edge 104 is slidably engaged by a clip 105 bolted to the exposed plate portion 94ᵃ.

While any desired type of actual load holder, such as a sling or other device particularly suitable to the work being done, may be attached to this plate structure, I herein show the loader as equipped with load handling forks 106, extending transversely with respect to the machine as a whole and having upwardly turned ends 107 which rest against the translate plate 95. At their upper extremities the fork ends 107 are apertured for pins 108, which are inserted through vertical webs 109 welded in spaced relation on the exposed face of plate 95, so that these forks may be readily detached whenever desired. Additional stiffening of the plate to prevent distortion of the load is provided by a heavy torque tube 110, welded lengthwise along the lower portion of the plate, between the innermost webs 109, and by means of vertical webs 111 and horizontal gussets 112. This structure may, of course, be varied, but the arrangement is such that the load on the forks 106 will be carried by the vertically movable plate structure, which travels with the back plate 87, without any distortion of these plates which would interfere with either the pitching or translate motions.

Figure 7:
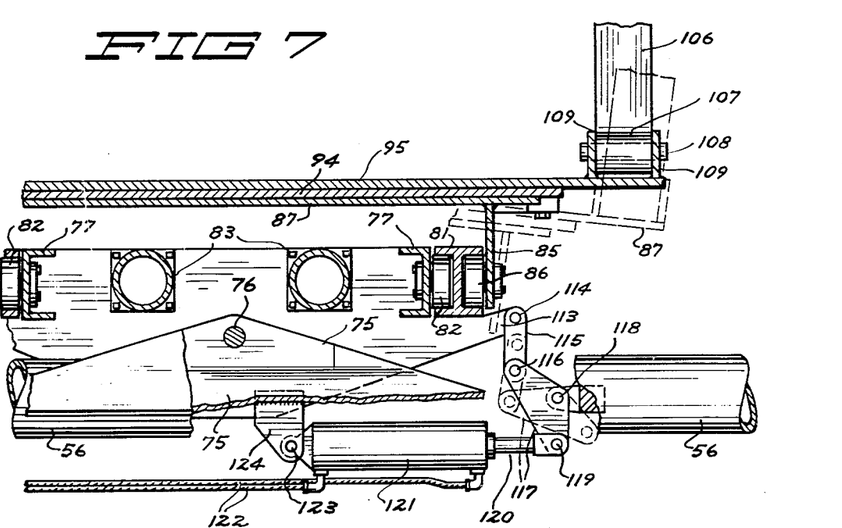
Fig. 7 is a further enlarged horizontal sectional and detail view taken substantially along the line 7—7 in Fig. 5 and particularly showing the mechanism by which the yaw motion is hydraulically produced.

The lower plate 79, forming a mounting part of the loader structure by which the latter yaws about the axis of pins 76, is provided at one end with an apertured ear 113 carrying a vertical pivot pin 114 for the connection thereto of a double link 115. The opposite end of the latter is pivoted by vertical pin 116 to a double bell crank 117, which fulcrums by means of a vertical pin 118 or a stud depending from the tube 56. The other corner of the bell crank 117 has a vertical pivot attachment 119 to the plunger 120 of a cylinder 121, to the opposite ends of which fluid under pressure is selectively admitted through conduits 122. The cylinder 121 is pivoted at 123 to a lug 124, welded to the lower bracket plate 75, thus positioning the cylinder so that the extension and retraction of the plunger 120 will oscillate the bell crank 117, as illustrated in Fig. 7, and this motion will be translated through the link 115 to opposite yawing motions of the loader structure, during which it swings in a horizontal plane about the axis of the yaw pivot pin 76. See Fig. 4.

The pitching motion of the loader is carried out by means of a cylinder 126 shown in Figs. 3 and 6, one end of which is pivoted by horizontal pin 127 to a bracket 128 extending forwardly from the back plate 87. For clearance the exposed portion 94ᵃ of the pitch plate is notched at 129 around this bracket and the cylinder 126 extends longitudinally along the bottom of the loader assembly, having an extensible and retractible plunger 130 connected by a horizontal pivot pin 131 to a bracket secured to the exposed portion 94ᵃ of the pitch plate. Thus the selective admission to the opposite ends of the cylinder 126 of fluid under pressure, supplied through the flexible conduits 132, will extend or retract the plunger 130, and since this plunger and cylinder assembly is connected between the back plate 87 and pitch plate 94, the latter will necessarily be oscillated about the pivot stud 96 to swing the load carrier and fork in a vertical, longitudinal plane to pitch the load in either of two opposite directions, one of which is suggested in Fig. 1.

The translate motion of the load carrier and fork is accomplished by shifting the plate 95 lengthwise with respect to the other plates 87–94, and for this purpose I provide, above the torque tube 110, a cylinder 133 pivoted at one end by a vertical pivot pin 134 to the adjacent web 111. This cylinder 133 has an extensible and retractible plunger 135 and the forked extremity thereof is connected by a vertical pin 136 to a bracket flange 137, welded to the plate 94 and projecting therefrom out through an elongated clearance slot 138 in the plate 95. Thus the extension and retraction of the plunger 135 by fluid under pressure, supplied selectively to either end of the cylinder 136 through flexible lines 139, will move the plate 95 and the connected forks 106 in opposite, longitudinal and generally horizontal directions.

While the specific details of the hydraulic system, by which fluid is supplied to the various actuating cylinders and the fluid motor 73, are not of special importance to the invention here involved, I do regard the arrangement of the necessary control valves as having merit and deserving description. There are, of course, six of such valves, all of which are arranged in the upper portion of the housing 39, and taking these valves in order, they respectively operate the jacks 42, the fluid motor 73 to move the loader transversely, the cylinders 83 for raising and lowering the load, the cylinder 133 for translating the load, the cylinder 126 for adjusting the pitch of the load, and finally the cylinder 121 by means of which the yaw motion is produced. As best shown in Fig. 4, these valves all have projecting operating handles and the jack valve has a vertically extending handle 140, arranged for swinging movement transversely of the machine, and the valve is so connected in the fluid circuit that the movement of this handle toward the open side of the machine frame will project the jacks 42 to their operative positions, and vice-versa. The valve controlling the transverse movement of the loader has a similarly arranged operating handle 141 and is so connected that movement of this handle toward the open side of the frame will move the loader outward in that direction, and vice-versa. The valve controlling the vertical movement, however, has a handle projecting horizontally, as designated at 142, and the valve is so connected that the upward swinging movement of this handle will cause the load to rise, and vice-versa. The valve controling the translation of the load has a handle 143, also extending upwardly, but arranged for longitudinal swinging movements, with the associated valves so connected in the circuit that the movement of this handle in either direction will be accompanied by the translation of the load in a corresponding direction. The valve controlling the pitching motion of the load has a cranked handle 144 extending out to the side of the machine, and this valve is operated by up and down swinging motions of this handle, with the valve so connected as to pitch the load in a direction corresponding with the motion given the control handle. Finally, the valve controlling the yawing motion is provided with a horizontally swingable, cranked operating handle 145, and the valve is so connected as to yaw the load in directions corresponding to the direction of movement of this handle. It will thus be apparent that all of the various actions are produced by the manipulation of the control handles 140–145 in directions which correspond exactly with the movement of the parts as controlled by these handles, and thus even a comparatively unskilled operator will be enabled to operate the machine without difficulty. The various motions through which the loader is put necessarily requires the use of quite long flexible conduits for connecting the valve and pump mechanism in the housing 39 to the various fluid motors and cylinders, and in order to support these lines as the loader moves inward and outward, as well as to prevent the lines from dangling or from becoming entangled, I provide a swingable arm 146, appearing in Fig. 4, one end of which is pivoted at 147 to the tube 56. This arm 146 will fold and unfold as the loader moves and it will properly support a sufficient length of conduits to permit all of the necessary motions, this arrangement being similar to that disclosed in my previous co-pending application.

The forks 106 may, of course, be used for handling any type of load to which they are suitable, but as one example of the use of the machine I have shown these forks as thrust through slides 148, provided for their accommodation below the base frame 149 of a load handling skid, designated generally at 150. This skid is provided with suitably arranged clamp bands 151, by the use of which a load such as a very long and heavy concrete pipe, designated at 152, may be held upon the skid. I do not, however, limit myself to the use of this particular type of skid and as stated the actual work holder or load holder may take any form desired or suitable without departing from the essence of my invention.

In the operation of the machine, and assuming it is desired to pick up, transport and position a load such as that represented in the drawing, the machine will be pulled up alongside the load and the brakes applied to the wheels, following which as a next step the jacks 42 will be thrust down into supporting engagement with the ground by manipulating control handle 140. The forks 106 will then be thrust outward beneath the load by moving the entire loader structure out to the open side of the frame, under control of the handle 141, and the lift control handle 142 will then be manipulated to elevate the forks to raise the load to a level such that it will clear the wheels, whereupon the loader forks will be drawn back inward and lowered to place the load in transport position, supported upon the cross tubes 10—11. The opposite motions, of course, will be gone through to redeposit the load upon the ground, when the point of disposal is reached by the machine, and alternatively the load may be placed in an elevated position by running up the loader tower to its fully extended position, either with the forks pulled back into the machine or in their laterally projected positions, as the case may be. It will, of course, be further apparent that the brakes and jacks will be properly adjusted, both to hold the machine stationary while the load is being picked up or disposed of and to free the machine for travel while the load is being transported.

My present invention makes it possible to very accurately position the load independently of the position of the machine as a whole. It is frequently necessary to move the load lengthwise in order to properly line it up with adjacent objects or for proper stacking, and this motion is accomplished here, without the necessity of moving the machine as a whole, simply by manipulating the control handle 143 to supply fluid to the cylinder 133 by which the load is moved endwise as previously described. It is also necessary in some cases to angle the load in a horizontal plane or to impart a yaw motion to the load to properly line it up, and this is accomplished by manipulating the control handle 146 to supply fluid to the cylinder 141 and pivot the entire assembly about the pivot pin 76. Finally it is necessary in many instances to pitch the load to various angles in a vertical plane, and this is accomplished under control of the valve handle 144 which supplies fluid to the cylinder 126 and rocks the loader assembly about the pivot 96, as has been described. These motions may, of course, be carried out singly or in various combinations and I find that I am thus enabled to very accurately and precisely position the load in all required directions, so that lumber may be neatly stacked, or elongated and heavy loads may be accurately positioned in relation to parts to which they are to be connected or into which they are to be assembled.

It is believed that further details of the construction, operation and advantages of the machine will be apparent without further description herein. It is understood that suitable modifications may be made in the structure as disclosed, provided such modifications come within the spirit and scope of the appended claims. Having fully illustrated and described my invention, what I claim to be new and desire to protect by Letters Patent is:

1. In a load handling and positioning machine of the character described, front and rear wheeled supports, a frame member rigidly connecting the supports and spaced from one side of the machine, a load carrier supported on the machine between said supports, means mounting the carrier for up and down movements, means mounting the carrier for transverse movements out from between the supports, means supporting the carrier for swinging movements about a vertical yaw axis, and means supporting the carrier for swinging movements about a horizontal pitch axis, all of said means being located between the said supports.

2. In a load handling and positioning machine of the character described, front and rear wheeled supports, a frame member rigidly connecting the supports and spaced from one side of the machine, a load carrier supported on the machine between said supports, means mounting the carrier for up and down movements, means mounting the carrier between said supports for transverse movements out from between the supports, means supporting the same carrier between said supports for swinging movements about a vertical yaw axis, and means supporting the same carrier for movements longitudinally of the machine.

3. In a load handling and positioning machine of the character described, front and rear wheeled supports, a frame member rigidly connecting the supports and spaced from one side of the machine, a load carrier supported on the machine between said supports, means mounting the carrier for up and down movements, means located between the supports mounting the carrier for transverse movements out from between the supports, and means supporting the carrier between the supports for pitching movements in vertical and longitudinal planes.

4. In a load handling and positioning machine of the character described, front and rear wheeled supports, a frame member rigidly connecting the supports and spaced from one side of the machine, a load carrier supported on the machine between said supports, means mounting the carrier between the supports for up and down movements, means mounting the carrier for transverse movements out from between the supports, and means located also between said supports supporting the carrier for translation lengthwise of the machine.

5. In a load handling and positioning machine of the character described, front and rear wheeled supports, a frame member rigidly connecting the supports and spaced from one side of the machine, a load carrier supported on the machine between said supports, means mounting the carrier for up and down movements, means mounting the carrier for transverse movements out from between the supports, means supporting the carrier for swinging movements about a vertical yaw axis, means supporting the carrier for pitch adjustments in a vertical and longitudinal plane, and means supporting the carrier for translation lengthwise of the machine.

6. In a load handling and positioning machine of the character described, front and rear wheeled supports, a frame member rigidly connecting the supports and spaced from one side of the machine, a load carrier supported on the machine between said supports, means mounting the carrier for up and down movements, means mounting the carrier for transverse movements out from between the supports, means supporting the carrier for swinging movements about a vertical yaw axis, means supporting the carrier for pitch adjustments in a vertical and longitudinal plane, means supporting the carrier for translation lengthwise of the machine, and separate fluid motors for adjusting the carrier in all of said directions.

7. In a device of the character described, a frame, a carriage movably supported by the frame, a loader, a vertical yaw pivot connecting the carriage and loader, a vertically movable load carrier including a back plate, means forming part of the loader for moving the load carrier up and down, a horizontal pivot on the back plate, a pitch plate pivoted on said horizontal pivot, means for swinging the pitch plate on said horizontal pivot and in a vertical plane, a translate plate and means slidably supporting the same on the pitch plate for horizontal movements, means for sliding the translate plate, and a load holder mounted on said translate plate.

8. In a device of the character described, a frame, a carriage movably supported by the frame, a loader, a vertical yaw pivot connecting the carriage and loader, a vertically movable load carrier including a back plate, means forming part of the loader for moving the load carrier up and down, a horizontal pivot on the back plate, a pitch plate pivoted on said horizontal pivot, means for swinging the pitch plate on said horizontal pivot and in a vertical plane, a translate plate and means slidably supporting the same on the pitch plate for horizontal movements, means for sliding the translate plate, and a load holder mounted on said translate plate, said plates being mounted face to face and vertically on edge.

9. In a device of the character described, a frame, a carriage movably supported by the frame, a loader, a vertical yaw pivot connecting the carriage and loader, a vertically movable load carrier including a back plate, means forming part of the loader for moving the load carrier up and down, a horizontal pivot on the back plate, a pitch plate pivoted on said horizontal pivot, means for swinging the pitch plate on said horizontal pivot and in a vertical plane, a translate plate and means slidably supporting the same on the pitch plate for horizontal movements, means for sliding the translate plate, and a load holder mounted on said translate plate, said plates being mounted face to face and vertically on edge, and the said pitch plate having edges curved on radii centered on the horizontal pivot and means on the back plate slidably engaging these edges.

10. A load handling machine of the character described, comprising a wheel borne frame having front and rear cross tubes and a loader supported therebetween, a backbone member connecting the cross tubes at one side of the frame only and the frame at the opposite side being open between said tubes, means supporting the loader for movement out through the open side of the frame with a load, jacks projectable from the open side of the frame against the ground to support the load, and means mounting the said jacks for movement into and out of the cross tubes themselves.

11. A load handling machine of the character described, comprising a wheel borne frame having front and rear cross tubes and a loader supported therebetween, a backbone member connecting the cross tubes at one side of the frame only and the frame at the opposite side being open between said tubes, means supporting the loader for movement out through the open side of the frame with a load, jacks projectable from the open side of the frame against the ground to support the load, and means mounting the said jacks for movement into and out of the cross tubes themselves, and including cam means to thrust the jacks down against the ground as the jacks are projected from the tubes.

12. In a load handling and positioning machine of the character described, a front and rear wheeled frame member having an opening in one side extending from top to bottom, a load holder, means mounting said load holder on said frame for up and down movements through said opening, means mounting said load holder on said frame for movements transversely of said machine in and out of said opening, and means mounting said load holder on said frame for swinging movements about a vertical yaw axis.

13. In a load handling and positioning machine of the character described, a front and rear wheeled frame member having an opening in one side extending from top to bottom, a load holder, means mounting said load holder on said frame for up and down movements through said opening, means mounting said load holder on said frame for movements transversely of said machine in and out of said opening, and means mounting said load holder on said frame for swinging movements about a horizontal pitch axis.

14. In a load handling and positioning machine of the character described, a front and rear wheeled frame member having an opening in one side extending from top to bottom, a load holder, means mounting said load holder on said frame for up and down movements through said opening, means mounting said load holder on said frame for movements transversely of said machine in and out of said opening, and means mounting said load holder on said frame for movements longitudinally of said machine.

15. In a load handling and positioning machine of the charatcer described, a front and rear wheeled frame member having an opening in one side extending from top to bottom, a load holder, means mounting said load holder on said frame for up and down movements tthrough said opening, means mounting said load holder on said frame for movements transversely of said machine in and out of said opening, means mounting said load holder on said frame for swinging movements about a vertical yaw axis, means mounting said load holder on said frame for swinging movements about a horizontal pitch axis, and means mounting said load holder on said frame for movements longitudinally of said machine.

References Cited in the file of this patent

UNITED STATES PATENTS

| | | |
|---|---|---|
| 2,324,817 | Bratley | July 20, 1943 |
| 2,410,373 | Westervelt | Oct. 29, 1946 |
| 2,575,552 | Glenn | Nov. 20, 1951 |
| 2,579,409 | White | Dec. 18, 1951 |
| 2,584,240 | Stewart | Feb. 5, 1952 |
| 2,591,544 | Hegarty | Apr. 1, 1952 |
| 2,597,086 | Morrow | May 20, 1952 |
| 2,598,730 | Thompson et al. | June 3, 1952 |
| 2,620,930 | Mullgardt | Dec. 9, 1952 |
| 2,621,811 | Lull | Dec. 16, 1952 |
| 2,646,182 | Maas | July 21, 1953 |